Oct. 31, 1967  A. OECHSLER  3,350,149
CAGE FOR ROLLER BEARINGS
Filed May 28, 1965
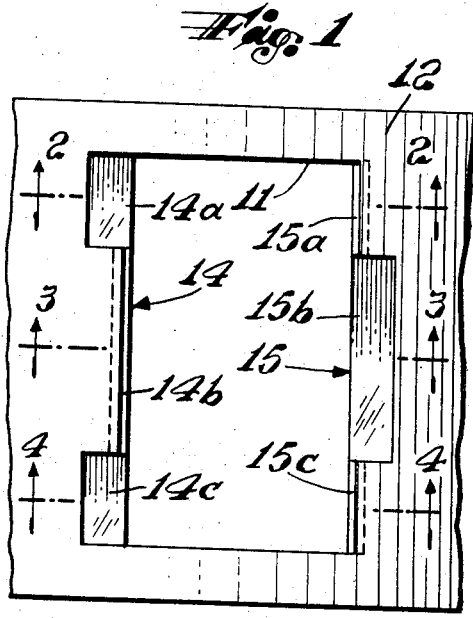
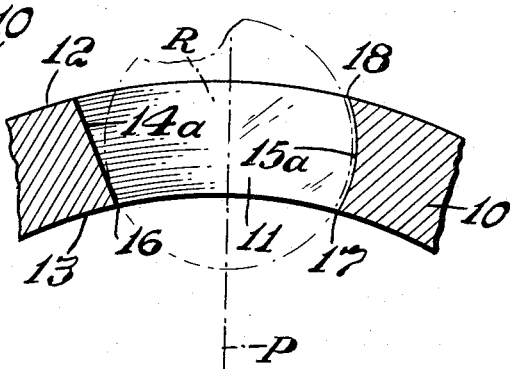
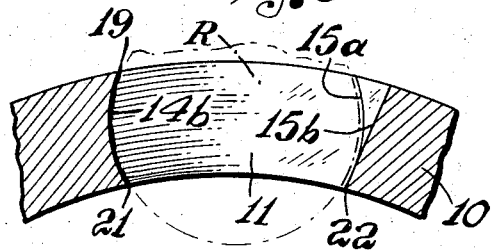
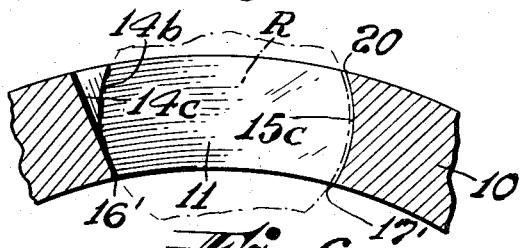
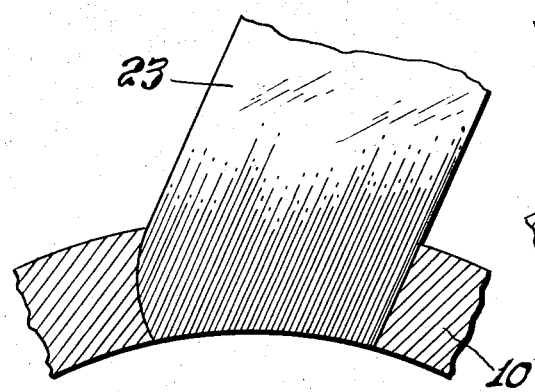
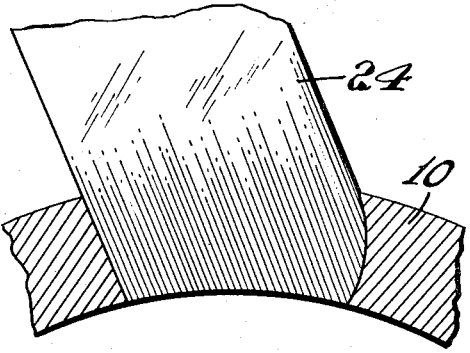
INVENTOR.
Albert Oechsler
BY United States Patent Office 3,350,149
Patented Oct. 31, 1967

3,350,149
CAGE FOR ROLLER BEARINGS
Albert Oechsler, Ansbach, Germany, assignor to SKF Kugellagerfabriken Gesellschaft mit beschrankter Haftung, Schweinfurt, Germany, a company of Germany
Filed May 28, 1965, Ser. No. 459,561
Claims priority, application Germany, May 30, 1964, 48,983/64
6 Claims. (Cl. 308—217)

ABSTRACT OF THE DISCLOSURE

In a cage for roller bearings, advantageously to be made by molding, each of two pocket-defining walls is formed by an axially alternating succession of plane and curved wall portions. Each pair of opposing wall portions consists of a plane and a curved wall portion and such opposing wall portions provide both inner and outer roller-holding or roller-retaining means. All pairs of opposing wall portions of two pocket-defining walls open either in inward or outward direction.

---

This invention relates to a cage or retainer for roller bearings, and especially to a cage for straight roller bearings. The term "roller bearings," as used in this specification and the appended claims, is meant to include roller, needle, single-row, and multiple-row bearings, and the term "rollers" covers rollers as well as needles.

The primary object of the present invention is to generally improve cages for roller bearings and to simplify and cheapen the manufacture of such cages.

The invention is concerned with a type of cage for roller bearings, as it ordinarily produced from metals or plastics by injection and compression molding, and casting.

In some of the prior constructions of this type of cage, the roller pockets are defined by plane surfaces which are either parallel, or converge, to the plane containing the axis of the cage and the axis of a given roller. While such pockets may easily be formed when molding and casting the cage, cages having such pockets have the disadvantage that the rollers are not on all sides safely held in their pockets. Attempts to eliminate this drawback led to designs of cages, which used curved pocket-defining walls shaped according to the rollers, but such designs required complicated molds and cores for the manufacture of the cages. In a known needle bearing cage using pocket-defining walls which converge toward the cage axis, the distance between the inner edges of opposing pocket walls is smaller than the diameter of the needles so that the needles are prevented from falling from the cage toward the interior thereof. Such cage has to be provided subsequently with needle-holding means to prevent the rollers from dropping in an outward direction. However, the subsequent provision of holding means is not applicable to all designs and, besides, the added holding means are not stable enough. Another known design of a cage for roller bearings provided walls in a center zone of the pockets, which diverged toward the cage axis and, thus, converged in an outward direction. This design did prevent rollers from falling from their pockets in an outward direction but again called for complicated mold parts some of which, after molding, had to be moved one after the other from the assembled mold.

Other objects of this invention are to overcome the disadvantages associated with known constructions of a cage of the referred to type, such as a lack of means for safely holding rollers in their pockets; the need for producing a cage in stages, first to mold the cage without roller-holding means and to add holding means only afterwards; and the requirement for complicated mold parts. The invention aims at a cage for roller bearings, which no longer requires complicated mold parts and a burdensome assembly and disassembly of molds, and at the same time permits single-stage or single-operation molding, immediately yielding safe roller-holding means.

In a prior construction which aimed at an improved cage for roller bearings, the rollers are resiliently received in pockets which are provided with several inner and outer holding projections in a lengthwise or axially alternating condition. By "inner" and "outer" holding projections, projections are meant which are, respectively, nearer the cage axis and farther away therefrom, and the referred to expression "holding projections in a lengthwise or axially alternating condition" relates to the axis of the cage and the lengthwise extent of the roller pockets and the rollers, and to alternating inclinations of portions of the pocket-defining surfaces. In this prior cage, the pocket-defining surfaces are formed by several plane portions which extend radially across the whole thickness or depth of the cage and differ in inclination. The differently inclined plane surface portions of each pocket follow each other in axial direction and intersect the plane containing the axis of the cage and the axis of a given roller along lines parallel to the axis of the cage and alternatingly at different sides of the axis of the respective roller, but forming the same angle with said plane. Opposing surface portions are parallel to each other and equally long. If the surfaces which define a pocket of this known construction consist, for instance, of three pairs of opposing portions, all six portions are plane and extend radially across the entire cage thickness. The three pairs follow each other axially, and the two portions of each pair are equally long and intersect each other along a line parallel to the axis of the cage. If the intersection of one of the outer pairs of the surface portions is outwardly of the axis of the roller, then the intersection of the next following or inner pair is inwardly of the roller axis, and the intersection of the then following or the other outer pair is again outwardly of the roller axis. The angles formed by the surface portions of each of the pairs and the plane through the axes of the cage and the respective roller are identical.

The just referred to prior cage offers the advantage of being moldable in a relatively simple mold. A disadvantage, however, is to be seen in the fact that the guidance of a roller parallel to its axis and along the length of the respective pocket is alternatingly outside and inside of the pitch circle, the imaginary circle located about halfway down the thickness or depth of the cage, and such alternating guidance often results in jamming actions. Further, employment of relatively thin-walled cages leads to holding means which are no longer large enough to ensure accurate holding. If the inclination of pocket walls, in the case of this cage, is increased, then the bridges between adjacent pockets become inadequate in strength, which creates the risk of breakage.

More specific and important objects of the invention center about a cage for roller bearings, which permits entry and withdrawal of all cores in the same general radial direction, avoids jamming, includes safe holding means, even with thin-walled cages, and creates no breaking hazards.

Broadly, the invention provides a cage for roller bearings, which comprises an annular body having an axis, an inner and outer boundary, and circumferentially spaced openings that extend radially from one of the two boundaries to the other. These openings form pockets to resiliently receive rollers. Each pocket is defined by opposing walls, and each of the opposing walls is formed by plane and curved wall portions. The portions of each wall follow each other alternatingly in axial direction. Each two walls which define a pocket are constituted by pairs of opposing wall portions, with each such pair including a plane and a curved wall portion. Thus, the wall portions of one of two opposing walls are staggeringly arranged with respect to the wall portions of the other of the two walls.

The specification is accompanied by a drawing in which:

FIG. 1 is a fragmentary elevation of a cage for roller bearings, embodying features of the invention;

FIGS. 2, 3, and 4 are sections taken in the planes of the line 2—2, 3—3, and 4—4, respectively; and FIGS. 5 and 6 are explanatory of the molding of the cage of the invention.

Referring to the drawing in greater detail now, and initially to FIGS. 1 to 4, a cage 10 of annular shape is provided with circumferentially spaced openings or pockets 11. Each pocket extends radially from one of the two boundaries of the cage to the other. The outer boundary is designated 12, and the inner boundary 13. The pockets are shown to be defined by two opposing walls 14 and 15, each of the two walls is shown to be formed by three distinct wall portions. The three portions of the wall 14 are designated 14a, 14b, and 14c, while the three portions of the wall 15 are identified by 15a, 15b, and 15c.

FIG. 2 shows that the wall portion 14a is plane and inclined so as to form an acute angle with a plane P containing the axes of the cage and of a roller R indicated within the pocket 11. The wall portion 15a which is opposite the wall portion 14a is curved, its curvature corresponding to that of the roller R.

The section of FIG. 3 shows a pair of opposite wall portions as does FIG. 2, the wall portions of FIG. 3 being 14b and 15b. The wall portion 14b is curved as the wall portion 15a, and the wall portion 15 is again plane and again inclined. The latter wall portion forms again an acute angle with the plane P shown in FIG. 2, but on the other side of the plane P. This angle need not be the same as that formed by the wall portion 14a and the plane P.

In FIG. 4, a pair of opposite wall portions 14c and 15c is shown. The portion 14c is plane and may be considered a continuation of the wall portion 14a. The portion 15c is curved and is a continuation of the wall portion 15a.

The function of the cage of the invention is as follows:

Each of the walls 14 and 15 is composed of three portions of different shapes. The six portions of the two walls form three pairs of opposite portions. The three portions of each of the walls follow each other axially, and so do the three pairs. Each pair is composed of equally long wall portions, and each wall corresponds in length to the length of the pocket formed and to the length of the roller to be received in the pocket.

Considering FIG. 2, the distance between the inner edges 16 and 17 of the wall portion 14a and 15a, respectively, is smaller than the diameter of the roller R so that the roller is prevented from dropping toward the center of the cage. Edge portions at 16 and 17 form roller-holding members. As far as the configuration of the wall portions 14a and 15a of FIG. 2 is concerned, they contain nothing that prevents the roller from leaving the pocket 11 in an outward direction.

It is the wall portion 14b of FIG. 3, which cooperates with the wall portion 15a and 15c of FIGS. 2 and 4, respectively, to block the roller in the outward direction. More specifically, the edge portion at 18 (FIG. 2) coacts with the edge portions at 19 and 20 (FIGS. 3 and 4), and the three edge portions together obstruct an undesired outward movement of the roller.

The three pairs of wall portions of the roller-defining pocket, as shown, provide roller-holding projections or members which are strong enough and thus safe. The holding members blocking inward movement of a roller are formed not only by the edge portions at 16 and 17 (FIG. 2) but also by edge portions at 21 and 22 (FIG. 3) and edge portions at 16' and 17' (FIG. 4). In the case of the two pairs of wall portions, shown in FIGS. 3 and 4, the distance between the inner edges of the opposing wall portions is the same as the one between the inner edges 16 and 17. The plane wall portions 14a, 15b, and 14c are inclined toward the plane P and thus appear to diverge in outward direction. The blocking of rollers in the outward direction is done by the outer edge portions at 18, 19, and 20 of the intermittent curved wall portions 15a, 14b, and 15c.

The great advantages that the cage of the invention can easily be formed, and with simple tools, too, will be apparent from FIGS. 5 and 6. FIG. 5 shows a core 23 in molding position to form the wall portions 14b and 15b. FIG. 6 shows a core 24 when forming the wall portions 14a, 15a and/or 14c, 15c. The wall portions 14a, 15a and 14c, 15c may be formed with the aid of a single core or two separate cores. The cores 23 and 24 are assembled with the main sections of the mold (not shown) by introducing them in substantially crosswise movements. The withdrawal takes place in the reverse directions.

It is believed that the present invention and the construction and function of the form of cage, selected for illustration, as well as the many advantages of the invention will be fully understood from the foregoing detailed description. Some of the features and advantages of the invention are reviewed and pointed out hereinafter.

The cage of the invention has roller-holding means which ensure safe holding of the rollers on all sides, and provides at the same time that the rollers, by means of the curved wall portions, are held in the region of the circle half-way between the boundaries of the cage in positions positively parallel to the axis of the cage. The rollers are introduced into their pockets by resiliently deflecting or deforming intervening holding members, and once seated in their pockets, the rollers are held in place by the holding members which, when released from the deflecting force, resume their normal shape.

The cage can easily be formed by injection or compression molding, using simple molds. The pockets are formed with the aid of cores which are simple in design and require no complicated actuating mechanisms but can readily be moved into and out of the mold. From FIGS. 5 and 6 it will be clear that the cage of the invention has no undercuts and permits, therefore, the use of simple and inexpensive molds.

All the plane wall portions form an acute angle with the plane containing the axes of the cage and of a given roller on the same radial side of the pocket holding said given roller. In the case of the embodiment of FIGS. 1 to 4, the intersection of the plane wall portions and planes such as the plane P are interiorly of the cage. FIGS. 5 and 6 relate to the manufacture of a cage such as the one of FIGS. 1 to 4. In a construction as shown in FIGS. 1 to 4, the inner holding members at 16, 21, and 16' continue throughout the width of the pocket, whereas the outer holding members at 18 and 20 are intermittently arranged. However, it will be apparent that the holding means which extend continuously throughout the width of the pockets may be provided on the outer boundary of the cage rather than on the inner boundary, so that the intermittent roller-holding would appear on the inner boundary. The latter arrangement is a reversal of the arrangement illustrated and exists when the plane wall portions are inclined to intersect planes such as plane P outwardly of the cage.

In the embodiment shown, the two opposite pocket-defining walls are shown to be formed by three pairs of wall portions, but it will be appreciated that they may as well be formed by more than three pairs of distinct wall portions. Also, the lengths of the pairs of wall portions may vary widely.

A great variety of materials can be used to make the cage of the invention. The material is selected according to the main qualities looked for, such as resilience, toughness, durability, favorable frictional conditions, dimensional stability under normally varying conditions of temperature and humidity. Different metals, metal alloys, and plastics are suitable. Plastics may be reinforced with glass fibers.

It will be understood that while the invention has been described in a single form only many changes and modifications may be made without departing from the spirit of the invention defined in the following claims.

What is claimed is:

1. Cage for roller bearings, comprising an annular body having an axis, an inner and outer boundary, and circumferentially spaced openings radially extending from one of said boundaries to the other, said openings forming pockets for resiliently receiving rollers, each of said pockets being defined by opposing walls, each of said walls being formed by plane and curved wall portions following each other alternatingly in axial direction, the opposing walls of each of said pockets being constituted by pairs of opposing wall portions, each of said pairs including a plane and curved wall portion the opposing wall portions of each of said pairs forming both inner and outer roller-holding members, and opening toward one and the same boundary of said inner and outer boundaries.

2. In the cage according to claim 1, each of said plane wall portions forming an acute angle with the plane containing said axis and the axis of a given roller on the same radial side of the respective pocket, each of said curved wall portions having a curvature substantially corresponding to that of the rollers.

3. In the cage according to claim 2, said acute angle formed by each of said plane wall portions with said plane being interiorly of the cage.

4. In the cage according to claim 3, each wall portion having an inner edge lying in said inner boundary and an outer edge lying in said outer boundary, at least a single of said two edges of each wall portion forming a roller-holding member, the distance between the inner edges of the wall portions of each of said pairs being smaller than the diameter of the rolls, the inner edges of the wall portions of said pairs forming inner roller-holding members extending over the whole width of said pockets, the outer edges of the curved wall portions of said pairs intermittently forming outer roller-holding members.

5. In the cage according to claim 1, each of said plane and curved wall portions extending from one of said boundaries to the other.

6. Cage for roller bearings, comprising an annular body having an axis, an inner and outer boundary, and circumferentially spaced openings radially extending from one of said boundaries to the other, said openings forming pockets for resiliently receiving rollers, each of said pockets being defined by opposing walls, each of said walls being formed by plane and curved wall portions following each other alternatingly in axial direction, the opposing walls of each of said pockets being constituted by pairs of opposing wall portions, each of said pairs including a plane and curved wall portion, the opposing wall portions of each of said pairs opening toward one and the same boundary of said inner and outer boundaries, each of said plane and curved wall portions extending from one of said boundaries to the other.

References Cited

UNITED STATES PATENTS

| 2,327,237 | 8/1943 | Baden | 308—217 |
| 3,138,849 | 6/1964 | Ortegren | 308—217 |
| 3,163,477 | 12/1964 | Schmidt | 308—217 |
| 3,251,118 | 5/1966 | Pitner | 308—217 |

EDGAR W. GEOGHEGAN, *Primary Examiner.*

FRANK SUSKO, *Examiner.*